(12) United States Patent
Liu et al.

(10) Patent No.: US 7,867,669 B2
(45) Date of Patent: Jan. 11, 2011

(54) SOLID POLYMER ELECTROLYTE COMPOSITE MEMBRANE COMPRISING LASER MICROMACHINED POROUS SUPPORT

(75) Inventors: Han Liu, Waltham, MA (US); Anthony B. LaConti, Lynnfield, MA (US); Cortney K. Mittelsteadt, Natick, MA (US); Thomas J. McCallum, Ashland, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 1305 days.

(21) Appl. No.: 10/970,673

(22) Filed: Oct. 21, 2004

(65) Prior Publication Data

US 2006/0065521 A1    Mar. 30, 2006

Related U.S. Application Data

(60) Provisional application No. 60/613,765, filed on Sep. 28, 2004.

(51) Int. Cl.
*H01M 8/10* (2006.01)
*C08J 5/22* (2006.01)
(52) U.S. Cl. .......................... 429/494; 521/27
(58) Field of Classification Search ............ 204/157.61; 428/118
See application file for complete search history.

(56) References Cited

U.S. PATENT DOCUMENTS

| | | | |
|---|---|---|---|
| 3,282,875 A | 11/1966 | Connolly et al. | |
| 3,972,727 A | 8/1976 | Cohn | |
| 4,215,183 A | 7/1980 | MacLeod | |
| 4,470,889 A * | 9/1984 | Ezzell et al. | ................ 205/516 |
| 4,478,695 A | 10/1984 | Ezzell et al. | |
| 4,849,311 A | 7/1989 | Itoh et al. | |
| 5,569,855 A * | 10/1996 | Schomburg et al. | ........... 73/700 |

(Continued)

FOREIGN PATENT DOCUMENTS

JP    1158051    6/1989

(Continued)

OTHER PUBLICATIONS

Weidner et al., "Engineering a Membrane Electrode Assembly," The Electrochemical Society Interface, 12(4):40-43 (Winter 2003).

*Primary Examiner*—Raymond Alejandro
*Assistant Examiner*—Maria J Laios
(74) *Attorney, Agent, or Firm*—Kriegsman & Kriegsman

(57) ABSTRACT

A solid polymer electrolyte composite membrane and method of manufacturing the same. According to one embodiment, the composite membrane comprises a rigid, non-electrically-conducting support, the support preferably being a sheet of polyimide having a thickness of about 7.5 to 15 microns. The support has a plurality of cylindrical pores extending perpendicularly between opposing top and bottom surfaces of the support. The pores, which preferably have a diameter of about 5 microns, are made by laser micromachining and preferably are arranged in a defined pattern, for example, with fewer pores located in areas of high membrane stress and more pores located in areas of low membrane stress. The pores are filled with a first solid polymer electrolyte, such as a perfluorosulfonic acid (PFSA) polymer. A second solid polymer electrolyte, which may be the same as or different than the first solid polymer electrolyte, may be deposited over the top and/or bottom of the first solid polymer electrolyte.

47 Claims, 5 Drawing Sheets

U.S. PATENT DOCUMENTS

| | | |
|---|---|---|
| 6,350,389 B1 | 2/2002 | Fujishima et al. |
| 6,492,431 B1 | 12/2002 | Cisar |
| 6,500,319 B2 | 12/2002 | LaConti et al. |
| 6,586,133 B1 | 7/2003 | Teeters et al. |
| 6,635,384 B2 | 10/2003 | Bahar et al. |
| 6,793,711 B1 | 9/2004 | Sammells |
| 2002/0182482 A1 | 12/2002 | Hockaday et al. |
| 2005/0026030 A1 | 2/2005 | Mardilovich et al. |
| 2005/0074651 A1* | 4/2005 | Kidai et al. .......... 429/30 |
| 2005/0095486 A1* | 5/2005 | Hamamoto et al. .......... 429/33 |
| 2006/0065522 A1 | 3/2006 | Liu et al. |

FOREIGN PATENT DOCUMENTS

| | | |
|---|---|---|
| JP | 2230662 | 9/1990 |
| JP | 2291607 | 12/1990 |
| WO | WO 2002059996 * | 8/2002 |
| WO | WO 02/081097 A1 | 10/2002 |
| WO | WO 2003068853 * | 8/2003 |
| WO | WO 2004/045750 A1 | 6/2004 |

* cited by examiner

SOLID POLYMER ELECTROLYTE COMPOSITE MEMBRANE COMPRISING LASER MICROMACHINED POROUS SUPPORT

CROSS-REFERENCE TO RELATED APPLICATIONS

The present application claims the benefit under 35 U.S.C. 119(e) of U.S. Provisional Patent Application Ser. No. 60/613,765, filed Sep. 28, 2004, the disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-FG36-04GO13029 awarded by the Department of Energy.

BACKGROUND OF THE INVENTION

The present invention relates generally to solid polymer electrolyte membranes of the type suitable for use in electrochemical devices and relates more particularly to a novel such membrane.

Electrochemical devices of the type comprising a solid polymer electrolyte membrane (PEM) sandwiched between a pair of electrodes are well-known, such electrochemical devices finding applications as, for example, fuel cells, electrolyzers, sensors, gas concentrators, gas compressors, supercapacitors, ultracapacitors and industrial electrochemical process units.

A common type of solid polymer electrolyte membrane consists of a homogeneous perfluorosulfonic acid (PFSA) polymer, said PFSA polymer being formed by the copolymerization of tetrafluoroethylene and perfluorovinylether sulfonic acid. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from DuPont (Wilmington, Del.) as NAFION® PFSA polymer.

Although PFSA PEMs function in a generally satisfactory manner in electrochemical devices, there nonetheless remains room for improvement in certain properties of PFSA PEMs. For example, one common difficulty associated with PFSA PEMs is a lack of mechanical strength, resulting in a tendency for the PFSA PEMs to tear, especially when being handled (such as during assembly of an electrochemical cell) or in stressed areas where compression is applied thereto (such as in peripheral areas of PEMs sealed under pressure to other electrochemical cell components). Such a lack of mechanical strength also often leads to electrical shorting, which results in premature failures during cell operation as the typical porous electrodes in contact with the PEM have a tendency to penetrate the softened PEM. This problem of shorting is even greater when the membrane is made thin (e.g., less than 25 microns) in order to decrease membrane resistance.

Because the tendency to tear and to short is greatest when the PFSA PEMs are wet (especially at elevated temperatures) and because the PFSA PEMs must be wet in order to function properly, one approach to this problem has been to assemble electrochemical cells with dry PEMs and then to subject the PEMs to a humidification process. This approach, however, has its own shortcomings. One such shortcoming is that the dry assembly requires special moisture-free facilities, such as a "dry room." Another such shortcoming is that the humidification process is time-consuming. Still another such shortcoming is that the humidification process typically results in the PEM swelling in a non-uniform manner, thereby creating stress in some areas of the PEM, as well as in other components of the cell that are in contact with the PEM, and introducing irregularities in the contact pressure applied over the entire active surface area of the PEM. (When the contact pressure is not uniform over the entire active surface area of the PEM, the performance of the electrochemical cell is adversely affected.) As can readily be appreciated, such irregularities are amplified where humidification is applied to a plurality of PEM-containing fuel cells arranged in a stack.

Moreover, if the PEM is subjected to variable conditions of humidity (e.g., alternating wet and dry intervals during periods of use and non-use, respectively), the membrane will undergo additional dimensional changes as it swells when wet and shrinks when dry. Such dimensional changes cause further stress to the PEM and to the other cell components, all of which are tightly packed together. If sufficiently great, such stress results in damage to the PEM and/or to the cell components in contact therewith. Pinholes/microcracks have a tendency to form along the edges where one side of the membrane is heavily compressed by the fixture while the other side can still partially swell.

One approach that has been taken to address the aforementioned problem of low mechanical strength of PFSA PEMs has been to cross-link the membrane polymer. Such cross-linking reduces the swelling of the membrane when wet which, in turn, reduces the deterioration of the mechanical strength of the membrane when wet. Unfortunately, however, such cross-linking tends to make the membrane undesirably brittle under dry conditions.

Another approach to this problem is disclosed in U.S. Pat. No. 6,635,384, inventors Bahar et al., which issued Oct. 21, 2003, and which is incorporated herein by reference. In the aforementioned '384 patent, there is described a composite membrane that comprises a microporous sheet, said microporous sheet preferably being an expanded polytetrafluoroethylene (ePTFE) membrane, said ePTFE membrane preferably being formed by stretching a sheet of polytetrafluoroethylene (PTFE) until pores are formed therein. The structure defining the pores of the microporous sheet is then at least partially covered with a functional material selected from (i) inorganic particulate; (ii) metal; and (iii) an organic polymer. In addition, the pores of the sheet are then at least partially filled with polymer electrolyte selected from (i) polymer compositions that contain metal salts; (ii) polymeric gels that contain electrolyte; and (iii) ion exchange resins, such as PFSA.

One disadvantage that has been noted by the present inventors regarding the foregoing composite membrane is that the pores of the expanded polytetrafluoroethylene (ePTFE) sheet tend to follow a tortuous pathway between opposing surfaces of the ePTFE sheet, as opposed to following a direct or straight pathway between opposing surfaces. As a result of these tortuous pathways, protons conducted through the pores (by means of the polymer electrolyte that is disposed within the pores) have to travel considerably longer pathways through the membrane than merely the thickness of the membrane. Such longer pathways result in a reduction in the conductivity of the membrane and an increase in the resistivity of the membrane.

Another disadvantage that has been noted by the present inventors regarding the foregoing composite membrane is that a microporous sheet of ePTFE possesses only slightly better mechanical strength than a PFSA PEM. Consequently, the foregoing composite membrane is not significantly stronger than a PFSA PEM and is subject to the same types of shortcomings discussed above in connection with PFSA PEMs.

Still another disadvantage that has been noted by the present inventors regarding the foregoing composite membrane is that the stretching process that is used to expand the PTFE sheet to create the desired pores tends to result in a fairly uniform yet random distribution of pores throughout the sheet and cannot be tailored to control the positioning or concentration of pores in particular regions of the sheet. This is unfortunate because certain regions of the membrane, such as the membrane active area edges/corners or the membrane contact area with the current collector, are typically subjected to greater stresses than other regions. Consequently, pores in these regions of high stress undesirably diminish membrane strength in those regions where membrane strength is needed most.

SUMMARY OF THE INVENTION

It is an object of the present invention to provide a novel solid polymer electrolyte membrane of the type that is suitable for use in electrochemical devices, such as, but not limited to, fuel cells, electrolyzers, sensors, gas concentrators, gas compressors, supercapacitors, ultracapacitors and industrial electrochemical process units.

It is another object of the present invention to provide a solid polymer electrolyte membrane of the type described above that overcomes at least some of the drawbacks discussed above in connection with existing solid polymer electrolyte membranes.

Therefore, according to one aspect of the invention, there is provided a solid polymer electrolyte composite membrane, said solid polymer electrolyte composite membrane comprising (a) a rigid, non-electrically-conductive support, said rigid, non-electrically-conductive support having opposing top and bottom surfaces and a plurality of pores extending from said top surface to said bottom surface; and (b) a solid polymer electrolyte at least partially filling at least some of said pores.

According to another aspect of the invention, there is provided a solid polymer electrolyte composite membrane, said solid polymer electrolyte composite membrane comprising (a) a non-electrically-conductive support, said non-electrically-conductive support having opposing top and bottom surfaces and a plurality of pores extending directly from said top surface to said bottom surface; and (b) a first solid polymer electrolyte at least partially filling at least some of said pores.

In a preferred embodiment, the non-electrically-conductive support is a polyimide membrane having a thickness of about 5 μm to 50 μm. A plurality of cylindrical pores are formed in the support by laser micromachining. The pores have a diameter of about 5 μm to 200 μm and are arranged in a defined pattern, such as in a uniform hexagonal pattern or in a pattern in which fewer pores are located in areas of higher membrane stress and more pores are located in areas of lower membrane stress. A solid polymer electrolyte, such as PFSA polymer, fills the pores. Additional solid polymer electrolyte, which may be the same as or different than that filling the pores, may be applied to one or both of the top and bottom surfaces of the solid polymer electrolyte filling the pores.

The present invention is also directed to a method of preparing a solid polymer electrolyte composite membrane and to the membrane prepared by said method. According to one aspect of the invention, such a method comprises the steps of (a) providing a non-electrically-conductive support; (b) lasing a plurality of pores through said non-electrically-conductive support; and (c) at least partially filling at least some of said pores with a first solid polymer electrolyte.

In a preferred embodiment, the lasing step comprises providing a beam of laser light capable of forming pores in said non-electrically-conductive support, then passing said beam of laser light through a mask having a pattern of openings, and then focusing the laser light transmitted through the pattern of openings in said mask onto a surface of said non-electrically-conductive support, whereby a plurality of pores are formed in said non-electrically-conductive support that correspond to said pattern of openings. Preferably, the laser light used is laser light from an excimer laser.

The present invention is also directed to membrane electrode assemblies incorporating the above-described composite composite membranes and to electrochemical devices incorporating the above-described composite membranes, such electrochemical devices including, but not being limited to, fuel cells, electrolyzers, gas concentrators, gas compressors, sensors, supercapacitors, ultracapacitors, and industrial electrochemical process units.

For purposes of the present specification and claims, it is to be understood that certain relational terms used herein, such as "above," "below," "top," "bottom," "over," "under," "in front of," or "behind," when used to denote the relative positions of two or more components of an electrochemical device are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute apart of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
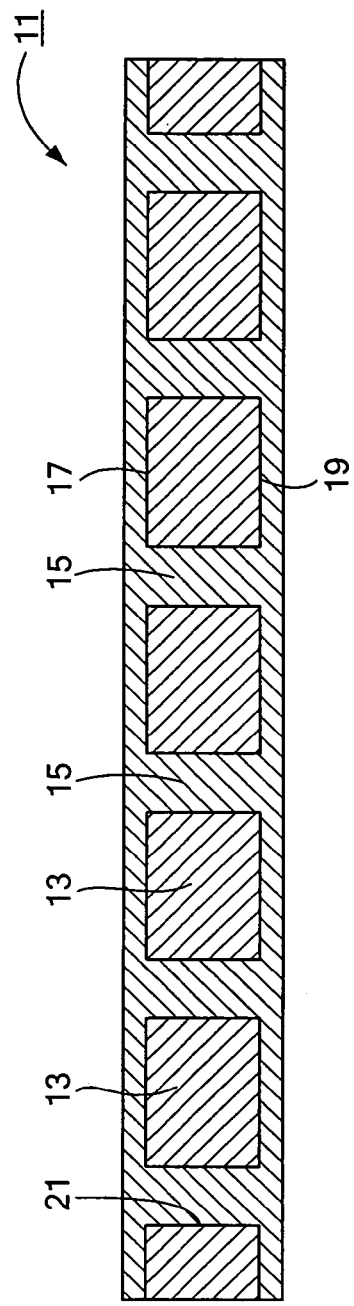
FIG. 1 is a schematic section view of a first embodiment of a solid polymer electrolyte composite membrane constructed according to the teachings of the present invention.

Referring now to FIG. 1, there is shown a schematic section view of a first embodiment of a solid polymer electrolyte composite membrane constructed according to the teachings of the present invention, said solid polymer electrolyte composite membrane being represented generally by reference numeral 11.

Composite membrane 11 comprises a non-electrically-conductive support 13 and a solid polymer electrolyte 15, support 13 being impregnated with solid polymer electrolyte 15.

Figure 2A:
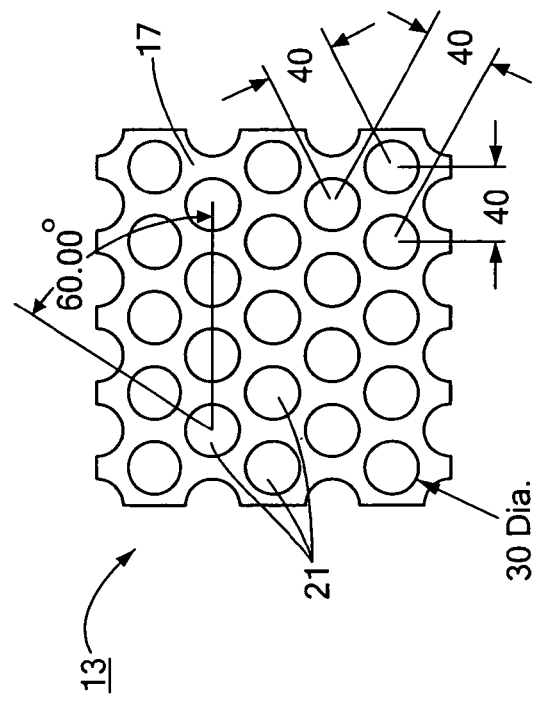
FIGS. 2(a) and 2(b) are top and perspective views, respectively, of the non-electrically-conductive support shown in FIG. 1.
Figure 2B:
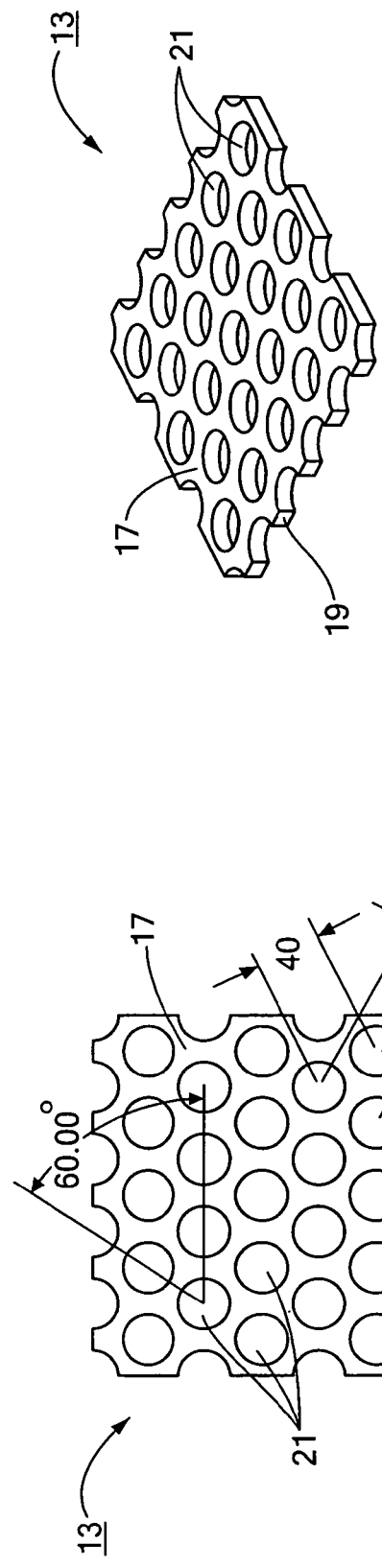

Referring now to FIGS. 2(a) and 2(b), support 13 can be seen to be a generally sheet-like, unitary structure, preferably of high mechanical strength, having a top surface 17 and a bottom surface 19. The thickness of support 13 may vary, depending upon the type of use to which membrane 11 is put and the types of pressures typically encountered by support 13 in such a use. For example, where membrane 11 is used in an electrolyzer, support 13 preferably has a thickness suitable for withstanding pressures of 2000-5000 psi. For most applications, support 13 has a thickness of about 5 µm to 50 µm, preferably about 7.5 µm to 15 µm.

As noted above, support 13 is preferably a rigid member; in addition, support 13 is preferably chemically resistant to acid and water hydrolysis at elevated temperatures. Examples of materials that may be used to make support 13 include, but are not limited to, perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide. A comparison of the mechanical strength of some of the above-listed polymers to conventional PEM materials is provided below in TABLE I.

TABLE I

| Material, condition | Young's Modulus (Mpa) |
|---|---|
| Nafion ® 112 PFSA membrane, dry 20° C. | 300 |
| Nafion ® 112 PFSA membrane, wet 80° C. | 70 |
| Poly(tetrafluoroethylene) (PTFE) | 400 |
| Polybenzimidazole (PBI) | 5900 |
| Polyphenylenesulfide (PPS) | 3300 |
| Polysulfone (PS) | 2600 |
| Poly(etherether-ketone) (PEEK) | 2700 |
| Polyimide (PI) | 2900 |

As can be seen, PBI, PPS, PS, PEEK and PI are substantially stronger than PFSA and PTFE and, therefore, are preferred as materials for use in making support 13.

Kapton® polyimide (DuPont, Wilmington, Del.), which has a high strength, good hydrolysis stability and excellent thermal properties, is a particularly desirable material for use in making support 13. Ultra-thin membranes of Kapton® polyimide (8.5 µm and 17 µm) are commercially available and may be used to make support 13. VECTRA® liquid crystal polymers (Goodfellow, Cambridgeshire, UK) also have superb mechanical, chemical and thermal stability and may be used to make support 13.

Although the polymers discussed above as suitable for use in making support 13 are non-ionic, ionomers may alternatively be used. Examples of suitable cationic ionomers include carboxylated, sulfonated or phosphorylated derivatives of the polymers discussed above. Examples of suitable anionic ionomers include amino, imimo, ammonium, sulfonium and phosphonium derivatives of the polymers discussed above.

A plurality of pores 21, preferably cylindrical in shape, extend in a direct, i.e. straight-line, fashion from top surface 17 to bottom surface 19 of support 13. It should be stressed that the base shape of the pore can be chosen from any two-dimensional geometric shape distributed in either regular or irregular fashion. As will be discussed further below, pores 21 are made by laser micromachining and preferably each have a diameter of about 5 µm to 200 µm, with pores 21 constituting about 20% to 95%, more preferably about 40% to 70%, of support 13.

The conductance of a membrane including such a porous support can be easily estimated as:

$$\frac{1}{G} = \frac{T_s}{\sigma * A * X} + \frac{(T - T_s)}{\sigma * A}$$

where G is the ionic conductance of the composite membrane, σ is the ionic conductivity of the solid polymer electrolyte, A is the geometric area of the composite membrane, X is the percentage of pores in the support, T is the thickness of the composite membrane and $T_s$ is the thickness of the support.

As can be seen from the above equation, the conductance of the composite membrane is inversely proportional to the percentage of pores in the support. Thus, a support with 50% pores results in a composite membrane with conductance equivalent to a homogenous membrane twice as thick. To maximize the conductance of the supported membrane without a sacrifice in mechanical properties, a support with 50% pores may be fabricated.

Figure 3:
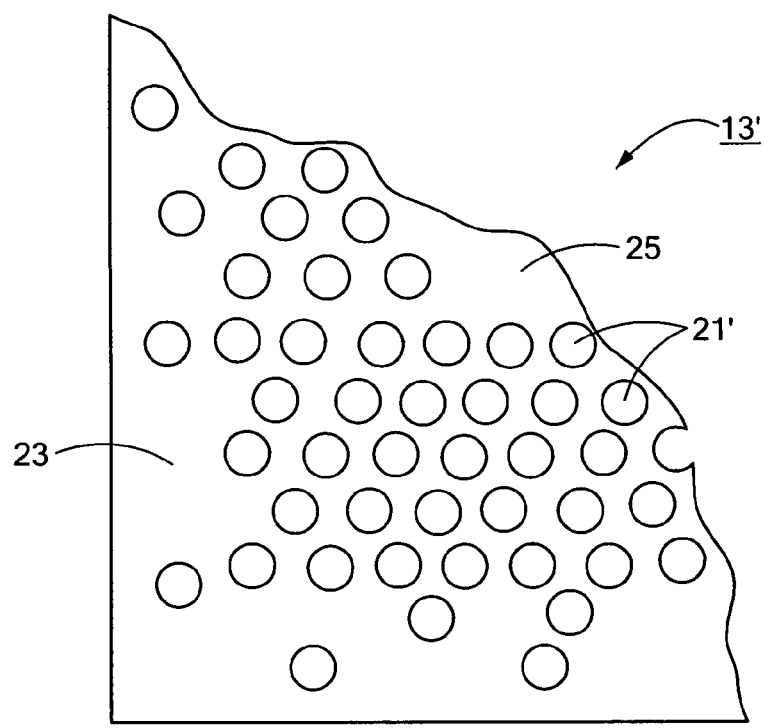
FIG. 3 is a fragmentary top view of a non-electrically-conductive support that may be used as an alternative to the non-electrically-conductive support of FIGS. 2(a) and 2(b)

In the present embodiment, pores 21 are arranged in a uniform hexagonal pattern over the entirety of support 13, such pores 21 having, for example, a diameter of about 25 µm and a center-to-center spacing of about 40 µm. It is to be understood, however, that the present invention is not limited to the above-described pattern of pores and may encompass a variety of different patterns of pores. For example, as can be seen in FIG. 3, there is shown a fragmentary top view of a support 13' having a plurality of pores 21' that are arranged so that a lesser concentration of pores 21' may be found in areas of higher membrane stress (e.g., at the membrane edge 23 or in local "hot spots" 25) and a greater concentration of pores 21' may be found elsewhere.

Figure 4:
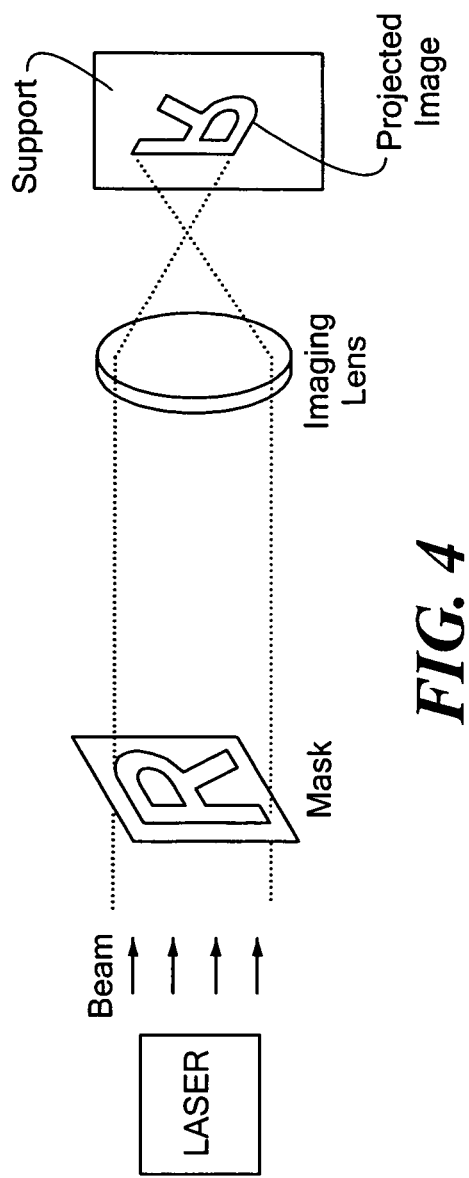
FIG. 4 is a schematic depiction of the laser micromachining technique of near-field imaging.

Pores 21 (and 21') are made by lasing support 13 with suitable laser light. Although either gas lasers or solid state lasers may be used to create pores 21, gas lasers are preferred. Within the class of gas lasers, excimer lasers are preferred over $CO_2$ lasers. This is because excimer lasers produce laser light having a much shorter wavelength than that produced by $CO_2$ lasers (~0.3 µm for an excimer laser vs. ~10 µm for a $CO_2$ laser). Consequently, because of their shorter wavelengths, excimer lasers directly excite the covalent bonds of the support and decompose the support without creating as extreme high-temperature conditions as is the case with $CO_2$ lasers. Additionally, due to their shorter wavelengths, excimer lasers can create significantly smaller pores than can $CO_2$ lasers.

Where a $CO_2$ laser is used to micromachine pores into the support, the whole laser beam is focused onto an area of the support until the irradiated area is ablated. Where an excimer laser is used, the relatively uniform beam intensity produced thereby provides an alternative approach to pore formation: near-field imaging. In near-field imaging, which is schematically depicted in FIG. 4, a mask having a pattern is placed in the path of the beam emitted by the excimer laser. The light transmitted through the pattern of the mask is then focused by an imaging lens onto the support, resulting in the mask pattern being projected onto the support, with a corresponding pattern of pores being formed in the support. As can readily be appreciated, near-field imaging enables various alternative patterns to be projected onto the support simply by using differently patterned masks.

Referring back to FIG. 1, solid polymer electrolyte 15 can be seen to fill pores 21 and to cover thinly top surface 17 and bottom surface 19 of support 13. Examples of suitable materials for use as solid polymer electrolyte 15 include (i) polymer compositions that contain metal salts; (ii) polymeric gels that contain electrolytes; and (iii) ion exchange resins. In general, if proton conductivity is required, a carboxylated, sulfonated or phosphorylated polymer is preferably used as solid polymer electrolyte 15. If hydroxyl ions are needed, a polymer containing amino, imimo, ammonium, sulfonium, and phosphonium groups is preferably used as solid polymer electrolyte 15. To enhance the ionic conductivity of membrane 11, inorganic ionically-conductive materials, such as metal oxide (e.g., $TiO_2$), silicon oxide, metal phosphates (e.g., zirconium phosphate) or heteropolyacids, may be impregnated into the solid polymer electrolyte 15.

A preferred material for use as solid polymer electrolyte 15 is a perfluorosulfonic acid (PFSA) membrane, such as is commercially available from DuPont (Wilmington, Del.) as NAFION® PFSA polymer. Of the aforementioned NAFION® PFSA polymers, particularly preferred are those having an equivalent weight of 200 to 2000, even more preferably those having an equivalent weight of 500 to 1200, the optimal equivalent weight depending on the use to which membrane 11 is applied.

Figure 5:
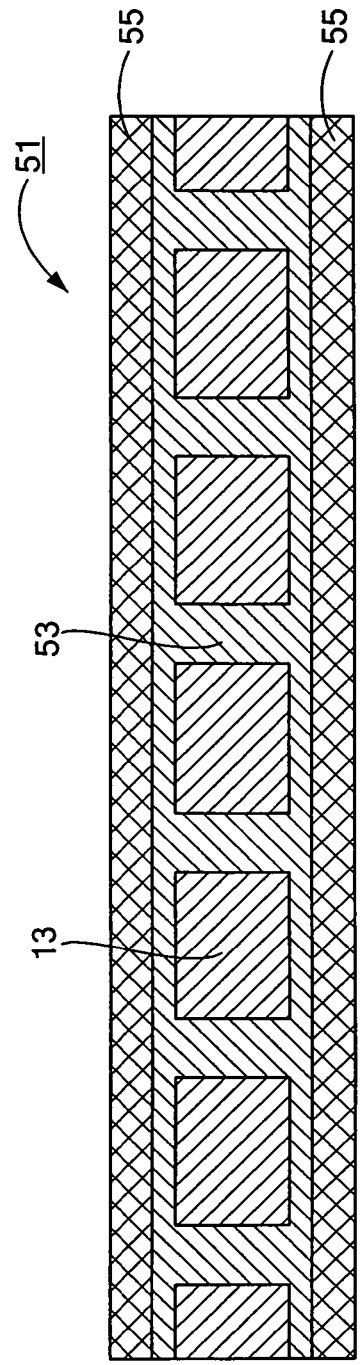
FIG. 5 is a schematic section view of a second embodiment of a solid polymer electrolyte composite membrane constructed according to the teachings of the present invention.

Various techniques may be used to couple solid polymer electrolyte 15 to support 13. One such technique involves providing the solid polymer electrolyte in the form of a solution/dispersion (e.g., Nafion® 1100 in water or isopropanol) and then coating support 13 with said solution/dispersion. Examples of suitable coating techniques include gravure coating, immersion (dip) coating, metering rod (Meyer bar) coating, slot die coating, rotary screen and air knife coating. The optimal coating technique for any particular case will depend on factors, such as instrument complexity, thickness accuracy, operation efficiency, initial investment, and the like. After the solution/dispersion is coated onto the support, the coated support is heated at about 50° C. to 100° C., preferably 80° C., for about 5 minutes to evaporate the solvent. If desired, one or more additional coatings may thereafter be applied. Said one or more additional coatings either may be of the same solution/dispersion previously applied in order to build up the thickness of the solid polymer electrolyte or may be different from the initial solution/dispersion in order to obtain a composite membrane with a multilayer electrolyte structure having desired properties. (An example of a composite membrane possessing such a multilayer structure is shown in FIG. 5, said composite membrane 51 comprising a support 13, a first solid polymer electrolyte 53 and a second polymer electrolyte 55.) After coating and drying each applied layer or after coating and drying all applied layers, the layer or layers are preferably cured by heating at a temperature greater than the glass transition temperature of the ionomer (e.g., 100° C. to 400° C., preferably 160° C. for 15 minutes). Such curing, which serves to sinter or anneal the ionomer, further enhances the mechanical properties of the membrane.

If desired, mask coating technology may be used to create a composite membrane wherein the solid polymer electrolyte is confined to certain patches or regions.

As an alternative to coating, the solid polymer electrolyte may be applied by spraying the polymer electrolyte solution/dispersion onto support 13. Conventional spraying techniques may be used for this purpose. Such spraying is preferably performed at 80° C. and does not require a subsequent solvent evaporation step. Micro-spraying may be used to create solid polymer electrolyte patches on the support, such patches, if desired, being far smaller than those capable of being produced by masked coating techniques.

Still another technique for incorporating the solid polymer electrolyte 15 into support 13 involves a membrane extrusion technique. Such a technique comprises providing the solid polymer electrolyte in the form of a thin membrane, stacking the thin ionomer membrane on the top and/or bottom surfaces of support 13, and then pressing the stack together at an elevated temperature, preferably above the melting point or glass transition temperature of the ionomer.

The total thickness of membrane 11 is preferably about 5 to 300 µm, more preferably 10 to 75 µm, with the thickness of the membrane being governed by application requirements. Generally, a water electrolyzer requires a thicker membrane due to its high differential pressure while an ultra-thin membrane is suitable for super capacitors since no dynamic pressure is involved for their operation.

Membrane and electrode assemblies (MEAs) comprising the composite membrane of the present invention can be fabricated by pressing a precast Pt-supported on carbon/ionomer ink onto each side of the composite membrane. The foregoing method is typically referred to as the decal transfer method.

One of the advantages of the composite membrane of the present invention is that catalyst ink can be directly coated or sprayed onto the top and bottom surfaces of the membrane. This direct coating of the catalyst ink is not practical for conventional ionomer membranes since such membranes change dimension when contacted with the ink. Since the composite membrane of the present invention has excellent dimensional stability when contacted with swelling agents, such as water or alcohols, the catalyst ink can be directly applied to the membrane.

Another approach that may be used to fabricate an MEA using the composite membrane of the present invention involves a technique called "catalyst on diffusion media." The diffusion medium of this technique is a porous electrically-conductive material, which is typically in the form of a thin sheet. Optionally, a microporous layer prepared from carbon black and a polymer binder may be applied to the diffusion medium. The catalyst is then sprayed onto the diffusion medium to form a diffusion electrode. A catalyst-loaded diffusion electrode is then pressed onto each side of the composite membrane to form a full MEA.

The following examples are provided for illustrative purposes only and are in no way intended to limit the scope of the present invention:

Example 1

A plurality of pores were formed in a piece of 8 μm thick Kapton® polyimide film (DuPont, Wilmington, Del.) using an excimer laser and near-field imaging. The diameter of each pore was 30 μm, and the distance between the centers of the pores was 40 μm. Nafion® PFSA solution, with an equivalent weight of 1100, was coated onto the porous film, and the product was then heated to dry off the solvent from the coated PFSA solution and to cure the PFSA polymer. The resultant composite membrane had a thickness of approximately 32 μm. The mechanical strength of said composite membrane was then compared to that of Nafion® 112 PFSA film and found to be approximately 100 times stronger than Nafion® 112 PFSA film at elevated temperatures.

Example 2

A composite membrane identical to that of Example 1 was prepared. A catalyst in the form of a carbon black supported platinum was sprayed onto plastic thin films to form catalyst decals. The catalyst decals were then hot pressed against opposing surfaces of the composite membrane to form an MEA. The MEA was then sandwiched between two pieces of teflonated porous carbon paper and assembled into a functional PEM fuel cell as described in U.S. Pat. No. 4,215,183, inventor MacLoed, which issued Jul. 29, 1980, the disclosure of which is incorporated herein by reference.

The foregoing PEM fuel cell was then tested at 80° C., with the anode saturator temperature controlled at 90° C. and the cathode saturator temperature controlled at 65° C.

Figure 6:
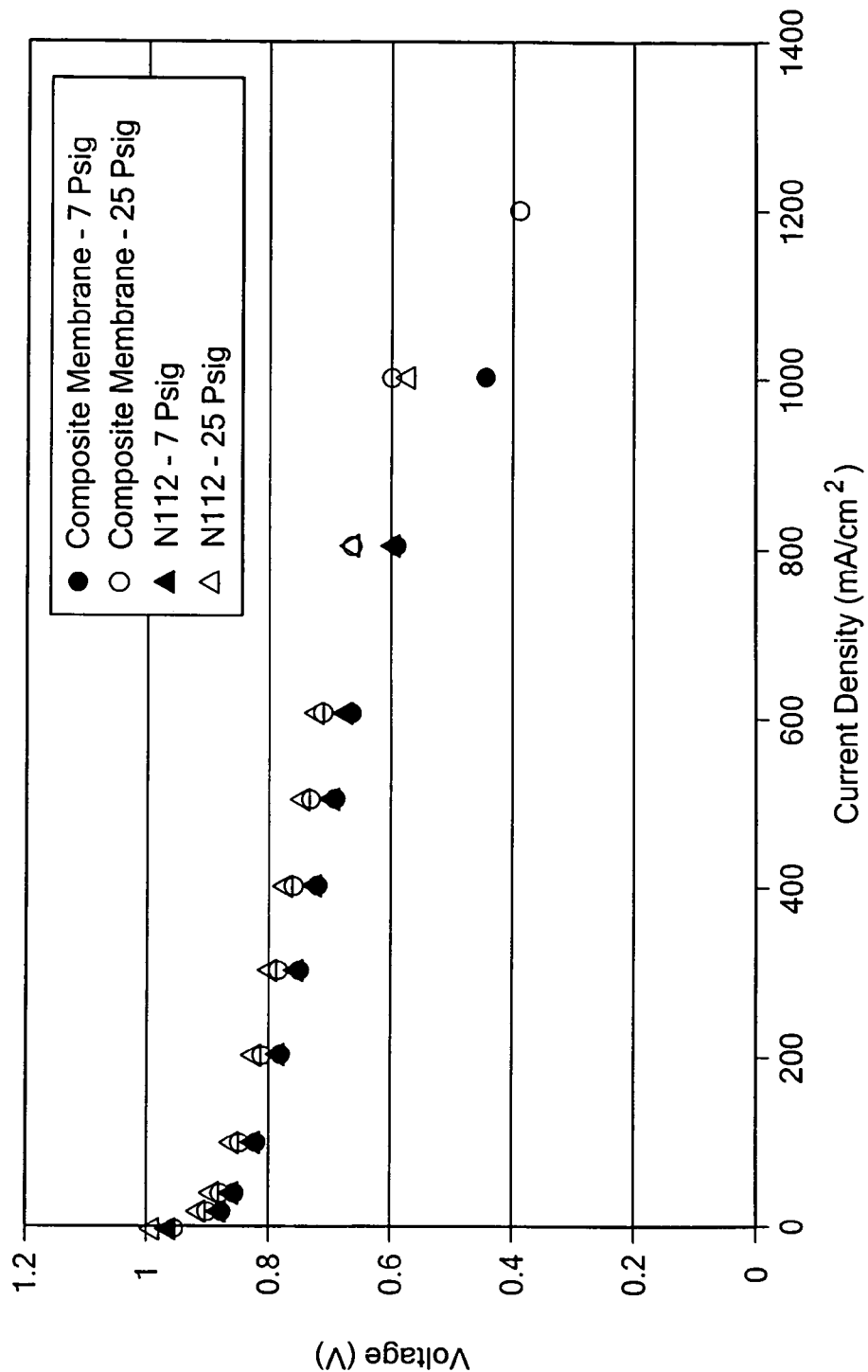
FIG. 6 is a graphic depiction comparing the performance of a fuel cell containing the composite membrane of the present invention to a fuel cell containing a conventional PFSA membrane.

As can be seen in FIG. 6, the performance of the subject fuel cell was similar to a fuel cell containing a Nafion® 112 PFSA membrane having a thickness of 50 μm.

Example 3

Figure 7:
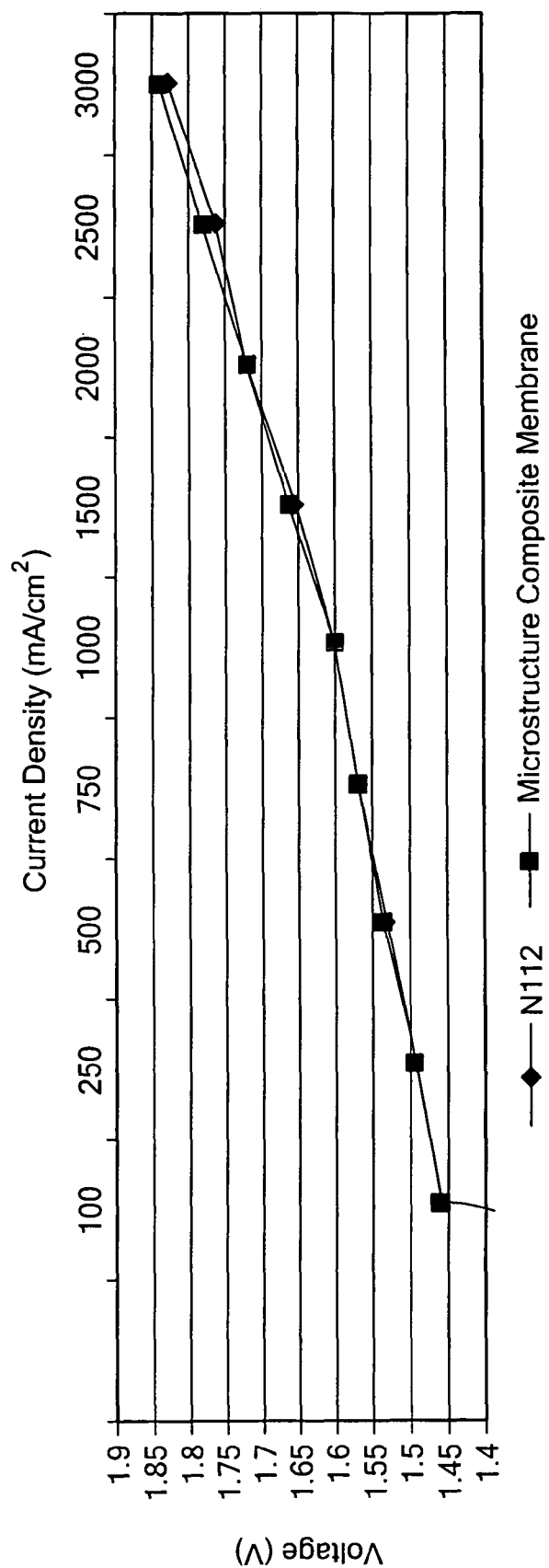
FIG. 7 is a graphic depiction comparing the performance of an electrolysis cell containing the composite membrane of the present invention to a fuel cell containing a conventional PFSA membrane.

A composite membrane identical to that of Example 1 was prepared. A pure Pt black catalyst serving as a cathode catalyst and a Pt/Ir mixture serving as an anode catalyst were pressed onto opposing surfaces of the composite membrane to form an MEA. The MEA was sandwiched between porous titanium metal meshes or sinters and assembled into an electrolysis cell as described in U.S. Pat. No. 6,500,319, inventors LaConti et al., which issued Dec. 31, 2002, the disclosure of which is incorporated herein by reference. The resulting electrolysis cell was operated at 80° C. under ambient pressure and its performance compared to a similar electrolysis cell containing a Nafion® 112 membrane. As can be seen in FIG. 7, the performance of the two electrolysis cells was similar.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A solid polymer electrolyte composite membrane, said solid polymer electrolyte composite membrane comprising:

(a) a rigid, non-electrically-conductive support, said rigid, non-electrically-conductive support having opposing top and bottom surfaces and a plurality of pores extending from said top surface to said bottom surface, wherein said pores are distributed throughout said rigid, non-electrically-conductive support, said pores being distributed unevenly, with at least some of the pores being located in areas of higher membrane stress and at least some of the pores being located in areas of lower membrane stress wherein the areas of higher membrane stress are located at the edges of the support, with fewer pores being located in areas of higher membrane stress and more pores being located in areas of lower membrane stress; and (b) a first solid polymer electrolyte at least partially filling at least some of said pores.

2. The solid polymer electrolyte composite membrane as claimed in claim 1 wherein each of said plurality of pores extends in a straight line perpendicularly from said top surface to said bottom surface.

3. The solid polymer electrolyte composite membrane as claimed in claim 1 wherein said rigid, non-electrically-conductive support has a periphery, wherein some of said pores are located distal to said periphery and some of said pores are located proximate to said periphery, and wherein said pores are positioned in a greater concentration distal to said periphery than proximate to said periphery.

4. The solid polymer electrolyte composite membrane as claimed in claim 1 wherein said pores are cylindrical in shape.

5. The solid polymer electrolyte composite membrane as claimed in claim 1 wherein said pores have a diameter of about 5 to 200 microns.

6. The solid polymer electrolyte composite membrane as claimed in claim 5 wherein said pores have a diameter of about 5 microns.

7. The solid polymer electrolyte composite membrane as claimed in claim 1 wherein said pores constitute about 20% to 95% of said rigid, non-electrically-conductive support.

8. The solid polymer electrolyte composite membrane as claimed in claim 7 wherein said pores constitute about 40% to 70% of said rigid, non-electrically-conductive support.

9. The solid polymer electrolyte composite membrane as claimed in claim 8 wherein said pores constitute about 70% of said rigid, non-electrically-conductive support.

10. The solid polymer electrolyte composite membrane as claimed in claim 7 wherein said pores constitute about 95% of said rigid, non-electrically-conductive support.

11. The solid polymer electrolyte composite membrane as claimed in claim 1 wherein said rigid, non-electrically-conductive support comprises a polymer selected from the group consisting of perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide.

12. The solid polymer electrolyte composite membrane as claimed in claim 11 wherein said rigid, non-electrically-conductive support is made of polyimide.

13. The solid polymer electrolyte composite membrane as claimed in claim 1 wherein said rigid, non-electrically-conductive support has a thickness of about 5 to 50 microns.

14. The solid polymer electrolyte composite membrane as claimed in claim 13 wherein said rigid, non-electrically-conductive support has a thickness of about 7.5 to 15 microns.

15. The solid polymer electrolyte composite membrane as claimed in claim 1 wherein said first solid polymer electrolyte is selected from the group consisting of polymer compositions that contain metal salts, polymeric gels that contain electrolyte and ion exchange resins.

16. The solid polymer electrolyte composite membrane as claimed in claim 15 wherein said first solid polymer electrolyte is an ion exchange resin.

17. The solid polymer electrolyte composite membrane as claimed in claim 15 wherein said first solid polymer electrolyte is perfluorosulfonic acid (PFSA) polymer.

18. The solid polymer electrolyte composite membrane as claimed in claim 17 wherein said PFSA polymer has an equivalent weight of about 200 to 2000.

19. The solid polymer electrolyte composite membrane as claimed in claim 18 wherein said PFSA polymer has an equivalent weight of about 500 to 1200.

20. The solid polymer electrolyte composite membrane as claimed in claim 1 wherein at least some of said pores are completely filled with said first solid polymer electrolyte, said solid polymer electrolyte composite membrane further comprising a second solid polymer electrolyte positioned at least one of over the top and under the bottom of said first solid polymer electrolyte.

21. The solid polymer electrolyte composite membrane as claimed in claim 20 wherein said second solid polymer electrolyte differs from said first solid polymer electrolyte.

22. The solid polymer electrolyte composite membrane as claimed in claim 20 wherein said second solid polymer electrolyte is positioned over the top and under the bottom of said first solid polymer electrolyte.

23. The solid polymer electrolyte composite membrane as claimed in claim 1 wherein said solid polymer electrolyte composite membrane has a thickness of about 5 to 300 microns.

24. The solid polymer electrolyte composite membrane as claimed in claim 23 wherein said solid polymer electrolyte composite membrane has a thickness of about 10 to 75 microns.

25. The solid polymer electrolyte composite membrane as claimed in claim 1 wherein said rigid, non-electrically-conductive support is non-electrolytically-conductive.

26. The solid polymer electrolyte composite membrane as claimed in claim 1 wherein said rigid, non-electrically-conductive support is electrolytically-conductive.

27. The solid polymer electrolyte composite membrane as claimed in claim 26 wherein said rigid, non-electrically-conductive support comprises an anionic polymer electrolyte.

28. The solid polymer electrolyte composite membrane as claimed in claim 26 wherein said rigid, non-electrically-conductive support comprises a cationic polymer electrolyte.

29. The solid polymer electrolyte composite membrane as claimed in claim 1 wherein said first solid polymer electrolyte is impregnated with an inorganic ionic conductive materials.

30. The solid polymer electrolyte composite membrane as claimed in claim 1 wherein said pores constitute about 70% to 95% of said rigid, non-electrically-conductive support.

31. A composite membrane, said composite membrane being prepared by a process comprising the steps of:
  (a) providing a non-electrically-conductive support;
  (b) lasing a plurality of pores through said non-electrically-conductive support, wherein said pores are distributed throughout said non-electrically-conductive support, said pores being distributed unevenly, with at least some of the pores being located in areas of higher membrane stress and at least some of the pores being located in areas of lower membrane stress wherein the areas of higher membrane stress are located at the edges of the support, with fewer pores being located in areas of higher membrane stress and more pores being located in areas of lower membrane stress; and
  (c) at least partially filling at least some of said pores with a first solid polymer electrolyte.

32. The composite membrane as claimed in claim 31 wherein said non-electrically-conductive support has a Young's Modulus of at least approximately 2500 Mpa.

33. The composite membrane as claimed in claim 31 wherein said pores are formed at preselected locations in said non-electrically-conductive support.

34. The composite membrane as claimed in claim 31 wherein said lasing step comprises providing a beam of laser light capable of forming pores in said non-electrically-conductive support, then passing said beam of laser light through a mask having a pattern of openings, and then focusing the laser light transmitted through the pattern of openings in said mask onto a surface of said non-electrically-conductive support, whereby a plurality of pores are formed in said non-electrically-conductive support that correspond to said pattern of openings.

35. The composite membrane as claimed in claim 34 wherein said pores are cylindrical in shape.

36. The composite membrane as claimed in claim 31 wherein said non-electrically-conductive support has a periphery and wherein said pores are positioned in a greater concentration distal to said periphery than proximate to said periphery.

37. The composite membrane as claimed in claim 31 wherein said lasing step is performed using a laser selected from the group consisting of gas lasers and solid state lasers.

38. The composite membrane as claimed in claim 37 wherein said lasing step is performed using a gas laser.

39. The composite membrane as claimed in claim 38 wherein said gas laser is an excimer laser.

40. The composite membrane as claimed in claim 31 wherein said non-electrically-conductive support comprises a polymer selected from the group consisting of perfluorinated polymers, polyvinylidene fluoride, poly(tetrafluoroethylene), polybenzimidazole, polyphenylenesulfide, polysulfone, polyethersulfone, polyesters, polyparaphenylene, polyquinoxaline, polyarylketone, polybenzazole, polyaramid, poly(etherether-ketone), liquid crystal polymers, polyimide and polyetherimide.

41. The composite membrane as claimed in claim 40 wherein said non-electrically-conductive support is made of polyimide.

42. The composite membrane as claimed in claim 31 wherein said pore filling step comprises providing said first solid polymer electrolyte in a solution, then coating said solution into said pores of said non-electrically-conductive support, evaporating any solvent in said solution and then curing said first solid polymer electrolyte.

43. The composite membrane as claimed in claim 31 wherein said pore filling step comprises providing said first solid polymer electrolyte in a solution and then spraying said solution into said pores of said non-electrically-conductive support.

44. The composite membrane as claimed in claim 31 wherein said pore filling step comprises providing said first solid polymer electrolyte as a membrane and then pressing said membrane against said non-electrically-conductive support at a temperature above the glass transition temperature of the first solid polymer electrolyte.

45. The composite membrane as claimed in claim 31 wherein said filling step comprises completely filling at least some of said pores with said first solid polymer electrolyte, said method further comprising depositing a layer of a second solid polymer electrolyte at least one of over said top surface and under said bottom surface of said first solid polymer electrolyte.

46. The composite membrane as claimed in claim 45 wherein said first and second solid polymer electrolytes are different.

47. A solid polymer electrolyte composite membrane, said solid polymer electrolyte composite membrane comprising:
(a) a non-electrically-conductive support, said non-electrically-conductive support having opposing top and bottom surfaces and a plurality of pores extending directly from said top surface to said bottom surface, wherein said pores are distributed throughout said non-electrically-conductive support, said pores being distributed unevenly, with at least some of the pores being located in areas of higher membrane stress and at least some of the pores being located in areas of lower membrane stress wherein the areas of higher membrane stress are located at the edges of the support, with fewer pores being located in areas of higher membrane stress and more pores being located in areas of lower membrane stress; and
(b) a first solid polymer electrolyte at least partially filling at least some of said pores.

* * * * *